March 28, 1967  C. W. ROBARGE  3,311,478
PROCESS FOR PREPARING A DRIED MEAT PRODUCT
Filed Jan. 15, 1964
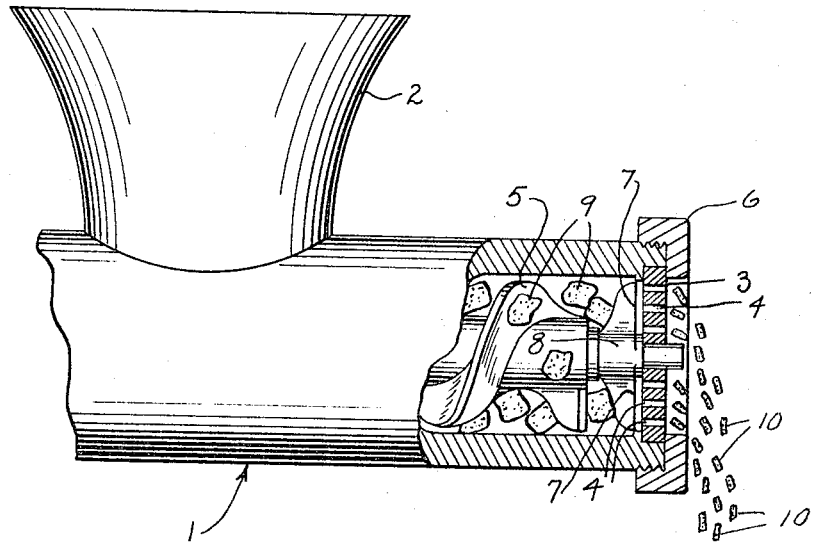
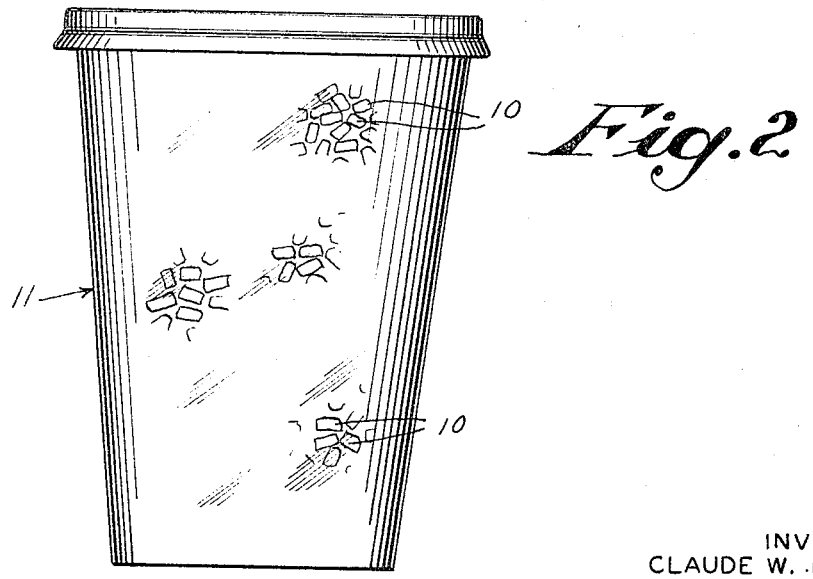
INVENTOR
CLAUDE W. ROBARGE
BY *Arthur H. Seidel*
ATTORNEY United States Patent Office 3,311,478
Patented Mar. 28, 1967

3,311,478
PROCESS FOR PREPARING A DRIED MEAT
PRODUCT
Claude W. Robarge, Cudahy, Wis., assignor to Patrick
Cudahy Inc., Cudahy, Wis., a corporation of Wisconsin
Filed Jan. 15, 1964, Ser. No. 337,819
1 Claim. (Cl. 99—208)

The present invention relates to a new dried meat product and to a process for making that product. This new dried meat product comprises small, individual buds of relatively low moisture and fat content which retain their separate identity when packed.

Both dried and smoked meat products have long been familiar items in commerce, and they are commonly available in sliced form or as pressed meat or as processed into sausage. The present invention provides a new dried meat product presently intended for use as a new dried beef product, wherein the dried meat is provided in the form of small meat buds, instead of thin slices or other forms as heretofore known. The term bud is used herein as descriptive of the appearance of the small nodules or granules of meat formed in practicing the invention, this appearance being similar to that of a developing bud. These meat buds are firm enough so as not to disintegrate, and at the same time they are dry enough and sufficiently free of fat so as not to conglomerate or stick together when packed. This new form of meat product opens new areas of application and promotes wider use of highly nutritious meats, inasmuch as it makes meat conveniently available for such diverse uses as an ingredient for salads, or pancakes, or in dressings of various sorts. As another example, it may also be sprinkled on or mixed with eggs to provide very palatable dishes, and end uses will become apparent as familiarity with the new product develops.

Chopped and ground meats as heretofore available have been of cohesive character, and they conglomerate so that they are normally used in ball form such as patties. Granular meat of the present invention conversely retains the character of individual buds, and it can be sprinkled or sown into a dish being prepared to have the meat uniformly dispersed. This characteristic of small, dry meat buds without the self-affinity of usual ground meat provides new uses of high protein meats in dishes ordinarily lacking this nutritional element. The culinary arts thus have made available a meat product that can be introduced into preparations where meat has not ordinarily been an ingredient.

In addition to the many new uses made possible, the dried meat bud has the desirable characteristic of bringing forth a piquant beef savor which provides a new flavor product. In addition to the new flavor, the new form provides a palatably pleasing new tactile sensation in its texture which will enhance its use in many new applications. Also, the new product has a distinctively attractive appearance, so that it can be advantageously distributed for display in glass jars, and it can lend an appetizing appearance to foods on the table.

Accordingly, it is an object of the present invention to provide a new dried meat product capable of much wider consumer use than has hitherto been possible with sliced products.

It is another object of the present invention to provide a new dried meat product that has a pleasingly different texture from that of previous meat products.

It is another object of the present invention to provide a new dried meat product which brings forth more meat flavor than has been experienced with prior dried meat products.

It is another object of the present invention to provide an attractive new meat product.

It is another object of the present invention to provide a process for making this new product.

It is another object of the present invention to provide a process for making the above mentioned new product with existing meat processing equipment.

The foregoing and other objects will appear from the description to follow. In the description, reference is made to the accompanying drawings which form a part hereof and in which there is shown by way of illustration a practice of the invention. The invention will be described in sufficient detail to enable those skilled in the art to practice it, but it is to be understood that other variations of the invention may be used and practiced without departing from the scope of the invention. Consequently, the following description is not to be taken in a limiting sense; instead, the scope of the present invention is best defined by the appended claim.

In the drawings:

FIG. 1 is a fragmentary view of a grinder showing the development of buds of the invention, and FIG. 2 is a view of a glass container filled with meat buds of the invention to illustrate their general appearance.

The product to be disclosed as a presently preferred embodiment of the invention may be described as small buds of dried beef. The buds of the preferred embodiment are about an eighth to a quarter of an inch in diameter and vary from about an eighth of an inch to a half an inch in length. They are of low fat content, preferably of about 4–5 percent, and of low moisture content, preferably about 52–58 percent, and they are a bright colored beef to present an attractive appearance. Other meats could be used provided that they are dry enough and lean enough so that the buds will not conglomerate, and firm enough so that the buds will hold their shape. The size of the buds can also vary depending upon the size of the grinding plate used to cut them, but the buds produced by a ⅛ inch plate seem to be of optimum size.

Since the dried beef buds are a high quality meat product, the quality of the raw material is of critical importance. Hence, the process for making the product of the present invention begins with the selection of the proper meat as a raw material. Accordingly, beef hams, including insides, outsides and knuckles, are chosen. The beef hams should have a bright uniform color and they should be free from blood clots, glands, cartilages, fibrous and scar tissue, discoloration, foreign odors, and loose or frayed pieces of meat. By contrast, oily, soggy or coarse textured beef, or beef from sloppy cows or bulls, or dark colored beef is not normally acceptable. The meat should be very lean with a minimum amount of intra muscular fat or marbling, and it should be trimmed from exterior fat and have all major tendous removed. The hams are separated into their component insides, outsides and knuckles, and trimmed to remove interior fat, pieces of fell, and loose pieces of meat. Depending upon the cut, the separated pieces will vary in size from six to twenty pounds a piece.

The selected beef is then ready for cure, but if it is not to be used promptly it should first be frozen. However, it is recommended that all knuckles be frozen before being placed in a cure. To freeze the meat it is first sharp frozen in a room over night at approximately 40° F. below zero. It is then dipped in water at 32° Fahrenheit for the purpose of forming an ice coating. Once it is frozen, it is ready to be stored in a room at approximately zero to 10° F. above zero.

When it is desired to cure the meat, it is removed from cold storage and defrosted. This may be accomplished by soaking in 60° F. water with air agitation until internal temperatures are about 40° F. Then, the meat should be allowed to stand one day before being placed in the cure.

For the cure, the meat is dipped in a hundred degree salometer plain brine solution, and then placed in a vat containing 92° salometer curing solution at 39° to 40° Fahrenheit. After the vat is filled with meat more curing solution is added to insure that all the meat is submerged, and then the vat is tightly covered. Periodically during curing the meat must be overhauled, that is to say, it must be transferred to a new vat so that the meat which has been at the top of a vat will be at the bottom and that at the bottom of a vat will be at the top to insure an even curing. If the overhaul is not properly conducted, the cured product will not have a uniform color, but will be spotty. The specific schedule for the overhaul is not uniform for all cuts of meat, but generally it should occur at progressive intervals of three days, five days, seven days, and ten days, give or take one or two days depending upon the cut and size of the chunks of meat. The meat is permitted to cure in this manner for a period of from twenty to sixty days, again depending upon the cut of the meat and the size of chunks.

The beef is then placed in clean vats which are filled with water at 40° to 55° Fahrenheit and the water is permitted to overflow until it is clear. The beef is water soaked for 24 hours to remove the excess curing solution from the outside of the chunks. During that 24 hours, the beef is overhauled and the water permitted to overflow until clear, three or four times.

After water soaking, the beef is removed and sent to the drying house. There the beef is hung in a circulating air environment of controlled humidity at a temperature of 140° Fahrenheit. The beef remains in the drying room from four to nine days depending upon the size of the chunks and the cut of the meat, the length of drying required being a matter of judgment on the part of the skilled personnel in charge.

After the meat has been dried, it is cooled to room temperature for a period of 24 hours and then it is hung in a cool room at 50° Fahrenheit for five days. In this last stage of the curing, the meat is "set up," that is to say, it is permitted to firm up, ready for cutting.

The final stage of processing of a product of the present invention is the cutting and packing stage. The dried beef chunks are first placed in a cutter and chopped into pieces of about an inch or two in diameter. These pieces of beef are then transferred to a grinder and ground, preferably through a plate with 1/8 inch openings and using a four blade knife, but another size plate, such as a 3/16 or 1/4 inch opening plate could be used, and of course the exact number of knife blades is not critical. Since the dried product is very firm, the grinding process is hard on the grinder, and it is important that both the knife blades of the grinder and the cutter be kept sharp. Also, the meat should be ground slowly so as to avoid smearing, and to produce the desired clean, discrete buds of meat. Contrary to experience with other meats, meat treated as described above will neither greatly swell nor extrude in long lengths in the grinding process, but will more closely adhere to the size of the cutter plate and break into short lengths to form the buds. As a final step, the dried beef buds are vacuum packed for commercial distribution, and this final product need not be refrigerated.

The formation of the buds is graphically illustrated in FIG. 1, where the cylinder 1 of a grinder is partially shown with parts in section. A hopper 2 feeds into the cylinder 1, and a plate 3 with openings 4 is fed by an auger type feed screw 5. The plate 3 is retained in place by a lock ring 6, and working against the plate 3 are knives 7 mounted in a knife holder 8. The screw 5 transports meat chunks 9 to the knives 7, and the meat is ground through the openings 4. On the outlet side of the plate 3 a number of dried meat buds 10 are shown. These buds 10 are ready for packing, and in FIG. 2 a representative vacuum packed glass container 11 is shown for the purpose of illustrating the texture of the buds 10 when packed. They retain individual identity, and when the container 11 is opened the buds 10 may be sprinkled or otherwise discharged without any balling of the buds into a large unitary, conglomerate mass.

The ability to retain individual identity of the meat buds is largely dependent upon a low moisture and fat content to minimize the cohesive character of the meat. To this end the original cuts selected should be lean and relatively fat free, and for the final product the fat content is preferably below eight percent. The drying process should reduce the moisture content to preferably less than sixty percent, and the range of 52–58 percent stated above has been satisfactory. The resulting product, of relatively low moisture and fat content, has a high protein value when select hind quarters, or the equivalent, are used. This protein content can attain a value of twenty percent. While the meat is said to be dried, it nevertheless remains in a form ready for immediate consumption. No preliminary preparations of the meat are required, and the moisture content remains a major constituent, so that there is no restoration. Thus, a food of high nutrient value is obtained which has uses not heretofore associated with meat.

The process of the invention produces a bright colored, attractive beef product, which can advantageously be distributed in glass jars for display to the buying public. For that reason, it is important to select bright colored beef, as the grinding of the product tends to subdue the color. Also, the meat product need not be smoked, since the smoking process tends to brown the meat, giving it a less attractive color. Beef has been found to lend itself particularly well to the product of the present invention because it is inherently firm and of comparatively low fat content. Also, it is a bright meat product which tends to retain its original color. That is not to say, however, that pork, veal, lamb, venison or other meats, both smoked and cured without smoking, cannot also be used to make the product of the present invention, achieving new flavor and texture sensations and lending itself to the many new uses to which the dried beef buds can be put.

I claim:

A process for making meat granules comprising:

selecting a lean beef and trimming substantially all fat therefrom;

placing said beef in a curing solution for a curing period;

removing the beef from the curing solution and drying the cured beef to remove moisture therefrom until a product is had with a moisture content of about 52% to 60% and a fat content that is less than about 8%; and grinding the meat to form individual granules of about 1/8 to 1/4 inch in diameter.

References Cited by the Examiner

UNITED STATES PATENTS

| 219,725 | 9/1879 | Hofmann | 99—208 |
| 1,372,527 | 3/1921 | MacLachlan | 99—208 |
| 2,346,232 | 4/1944 | Piret et al. | 99—208 |
| 2,439,180 | 4/1948 | McKee et al. | 99—208 |
| 2,461,291 | 2/1949 | McKee | 99—208 X |

FOREIGN PATENTS 940,003 10/1963 Great Britain.

A. LOUIS MONACHELL, *Primary Examiner.*

HYMAN LORD, *Examiner.*